United States Patent [19]

Perego

[11] Patent Number: 4,836,464
[45] Date of Patent: Jun. 6, 1989

[54] CASSETTE WINDING APPARATUS AND METHOD FOR OPERATING

[76] Inventor: Luciano Perego, Via Stefano Biffi 6, 20050 Mezzago (Milan), Italy

[21] Appl. No.: 146,327

[22] Filed: Jan. 21, 1988

[51] Int. Cl.⁴ ...................... B65H 20/16; B65H 19/22
[52] U.S. Cl. ................................. 242/56 R; 242/58.1; 226/92
[58] Field of Search ...................... 242/56 R, 58.1, 58, 242/67.3 R; 156/502–508; 226/92, 95, 91

[56] References Cited

U.S. PATENT DOCUMENTS

| | | | |
|---|---|---|---|
| 3,688,961 | 9/1972 | Becker | 226/92 |
| 3,814,343 | 6/1974 | Bennett et al. | 226/95 X |
| 4,497,454 | 2/1985 | Woodley | 242/56 R |
| 4,617,719 | 10/1986 | Woodley | 242/56 R |

*Primary Examiner*—Stuart S. Levy
*Assistant Examiner*—Steven M. du Bois
*Attorney, Agent, or Firm*—Curtis, Morris & Safford

[57] ABSTRACT

A cassette winding machine includes a tape winding unit for winding a predetermined length of tape from either a first supply reel or a second supply reel into a cassette. The first and second supply reels are rotatably mounted on hubs on the machine. A tape support holds the tape from the first supply reel as well as the tape from the second supply reel. The tape support is located on the supply reel side of the cassette winding machine between the supply reels and the tape winding unit. The cassette winding machine also includes a tape threading assembly that has a gripper device. The gripper device selectively grips and releases tape from either the first supply reel or the second supply reel. The tape gripper device grasps a selected one of the first and second tapes at a point near the tape support. Subsequently, the tape threading assembly moves the gripper device, which is holding the free end of the selected tape, from the supply reel side of the cassette winding machine to the opposite side of the cassette winding machine beyond the tape winding unit. Hence, the tape threading assembly moves the selected tape from one side of the cassette winding machine to the other side and places the selected tape across the tape winding unit. The tape winding unit may then utilize the selected tape for tape winding operations. Preferably, the tape threading assembly moves the gripper device in a substantially straight line between its initial threading position and its final threading position without encountering any guide rollers or other components.

25 Claims, 6 Drawing Sheets

CASSETTE WINDING APPARATUS AND METHOD FOR OPERATING

BACKGROUND OF THE INVENTION

The present invention relates in general to equipment that winds or loads tape, e.g., audio tape or videotape, into a cassette. More particularly, the present invention pertains to an apparatus and a method for automatically threading tape into the tape processing unit of such equipment.

Equipment for automatically winding blank or prerecorded magnetic tape into a cassette, for instance, an audio cassette or video cassette, is known. U.S. Pat. No. 3,637,153 discloses such a device.

Typically, the blank or prerecorded magnetic tape is provided on a supply reel, which is mounted on a hub on the cassette winding machine. The blank or prerecorded tape on the supply reel is commonly referred to as the use tape.

An empty cassette generally has two hubs that are connected by a leader. An empty cassette is inserted into the tape winding unit of the cassette winding machine to start the tape winding operation. A portion of the leader in the empty cassette is subsequently removed from the cassette and cut into two parts. The use tape from the supply reel is then spliced to one of the cut leader parts, and a predetermined length of the use tape is wound onto the associated hub. For instance, a section of the use tape sufficient for 30, 60, or 90 minutes of recording time may be wound onto the hub, or a section of the use tape containing a prerecorded program (e.g., one side of a record album or a movie) may be wound onto the hub. A control system appropriately controls the motors that turn the hub and the supply reel to maintain a suitable tension on the use tape during the tape winding operation. After the predetermined length of the use tape is wound onto the hub, the use tape is cut, and the cut section of the use tape is spliced to the other leader part. The now complete cassette is ejected from the tape winding unit, and another empty cassette is inserted into it. The tape winding operation is then repeated.

In order to reduce equipment downtime and increase efficiency, cassette winding machines with two hubs for two supply reels and with an automatic changeover unit were developed. Such a changeover unit is typically located along the tape travel path between the supply reels and the tape winding unit, where the use tape is utilized to produce a completed cassette, as described above. Conventional changeover units generally include a cutting and splicing device, which is separate and apart from the cutting and splicing device in the tape winding unit. This additional cutting and splicing device is commonly known as an auxiliary splicer.

During tape winding operations with a dual-reel cassette winding machine, the free end of the use tape from one of the supply reels, e.g., reel A, is usually held at the changeover unit, while the use tape from the other supply reel, e.g., reel B, travels through the changeover unit to the tape winding unit. When reel B is nearly empty, it is stopped. The use tape from reel B is then cut by the auxiliary splicer into two sections. One section of the cut tape is connected to the tape winding unit, while the other section of the cut tape is still connected to reel B. The section of the use tape from reel B that is connected to the tape winding unit is spliced to the free end of the use tape from reel A, and this section of tape from reel B is employed to guide the tape from reel A along the tape travel path to the tape winding unit. The other section of tape from reel B is wound back onto reel B. The use tape from reel A is then utilized in tape winding operations, while nearly empty reel B is removed and replaced with a full supply reel. Subsequently, when reel A is nearly empty, the changeover procedure is repeated.

The use of an auxiliary splicer on a dual-reel cassette winding machine is disadvantageous for several reasons, especially if the machine is the type that handles videotape. An auxiliary splicer may be a comparatively costly component. Moreover, an auxiliary splicer may be a relatively large component, which could increase the overall size of a machine. Furthermore, an auxiliary splicer is susceptible to operational problems, since it uses an adhesive material to splice tapes and the adhesive material may stick to and cause some moving parts to bind.

With conventional dual-reel cassette winding machines, the operator must manually thread the initial use tape from the supply reel, through the changeover unit and various guide rollers, to the tape winding unit. With conventional single-reel cassette winding machines, too, the operator must manually thread the use tape from the supply reel. If the operator was careless, he or she could be injured during the manual tape threading operation.

Accordingly, a need exists for a dual-reel cassette winding machine in which the auxiliary splicer is eliminated. Additionally, a need exists for a cassette winding machine with a device that threads the use tape from the supply reel to the tape winding unit automatically or with a minimal amount of operator intervention. Improved methods of operating cassette winding equipment are also required.

SUMMARY OF THE INVENTION

The present invention solves the problems with conventional cassette winding machines described above and satisfies the needs identified above. In addition, the present invention provides a dual-reel cassette winding machine without an auxiliary splicer and, therefore, eliminates the disadvantages associated with such a device. The present invention results in a safer, smaller, more reliable cassette winding machine than known equipment.

A cassette winding machine includes a tape winding unit for winding a predetermined length of tape from either a first supply reel or a second supply reel into a cassette. The first and second supply reels are rotatably mounted on hubs on the machine. A tape support holds the tape from the first supply reel as well as the tape from the second supply reel. The tape support is located on the supply reel side of the cassette winding machine between the supply reels and the tape winding unit. The cassette winding machine also includes a tape threading assembly that has a gripper device. The gripper device selectively grips and releases tape from either the first supply reel or the second supply reel. The tape gripper device grasps a selected one of the first and second tapes at a point near the tape support. Subsequently, the tape threading assembly moves the gripper device, which is holding the free end of the selected tape, from the supply reel side of the cassette winding machine to the opposite side of the cassette winding machine beyond the tape winding unit. Hence, the tape threading assembly moves the selected tape from one side of the cassette winding machine to the other side and places the selected tape across the tape winding unit. The tape winding unit may then utilize the selected tape for tape winding operations.

Preferably, the tape threading assembly moves the gripper device in a substantially straight line between its initial threading position, i.e., on the supply reel side of the tape winding unit, and its final threading position, i.e., on the other side of the tape winding unit. The tape threading assembly may include, for example, an endless thread screw, one or more guide rods, a movable head, and a cam follower. The cam follower is attached to the movable head, and these components are mounted on the endless thread screw. The endless thread screw and the cam follower cooperate to displace the movable head as the endless thread screw is rotated. Accordingly, the movable head is displaced as the endless thread screw is rotated. The guide rod or rods direct the movable head as it travels from its starting point to its stopping point.

A cassette winding machine according to this aspect of the invention advantageously includes a mechanism for seating the selected tape in the tape winding unit. Where the tape winding unit has a lifting arm that lifts a leader from an empty cassette, the seating mechanism may desirably employ the lifting arm to seat the selected tape in the tape winding unit.

Furthermore, a cassette winding machine according to this aspect of the invention preferably includes a vacuum chamber device for controlling the tension of the tape together with a mechanism for inserting the tape into the vacuum chamber device. The vacuum chamber device is located on the same side of the tape winding unit as the tape support. The tape insertion mechanism may include a push rod along with an actuator for the push rod.

A cassette winding machine according to this aspect of the invention may shift the tape support between a first position and a second position. When the tape support is in the first position, the tape threading assembly may suitably position the gripper device so that the gripper device may grasp the first tape. Correspondingly, when the tape support is in the second position, the tape threading assembly may appropriately position the gripper device so that the gripper device may grasp the second tape. The tape support may include two support blocks, one for the tape from each supply reel. Furthermore, each support block may be connected to a vacuum, whereby a support block holds a tape when the tape is placed in close proximity to the support block.

The present invention involves other aspects, as a person having ordinary skill in the art will understand after reviewing the following detailed description.

BRIEF DESCRIPTION OF THE DRAWINGS

The above and other advantages of the present invention will become apparent upon consideration of the following detailed description of an illustrative embodiment thereof, especially when reviewed in conjunction with the accompanying drawings, wherein.

DETAILED DESCRIPTION OF THE PREFERRED EMBODIMENT

Figure 1:
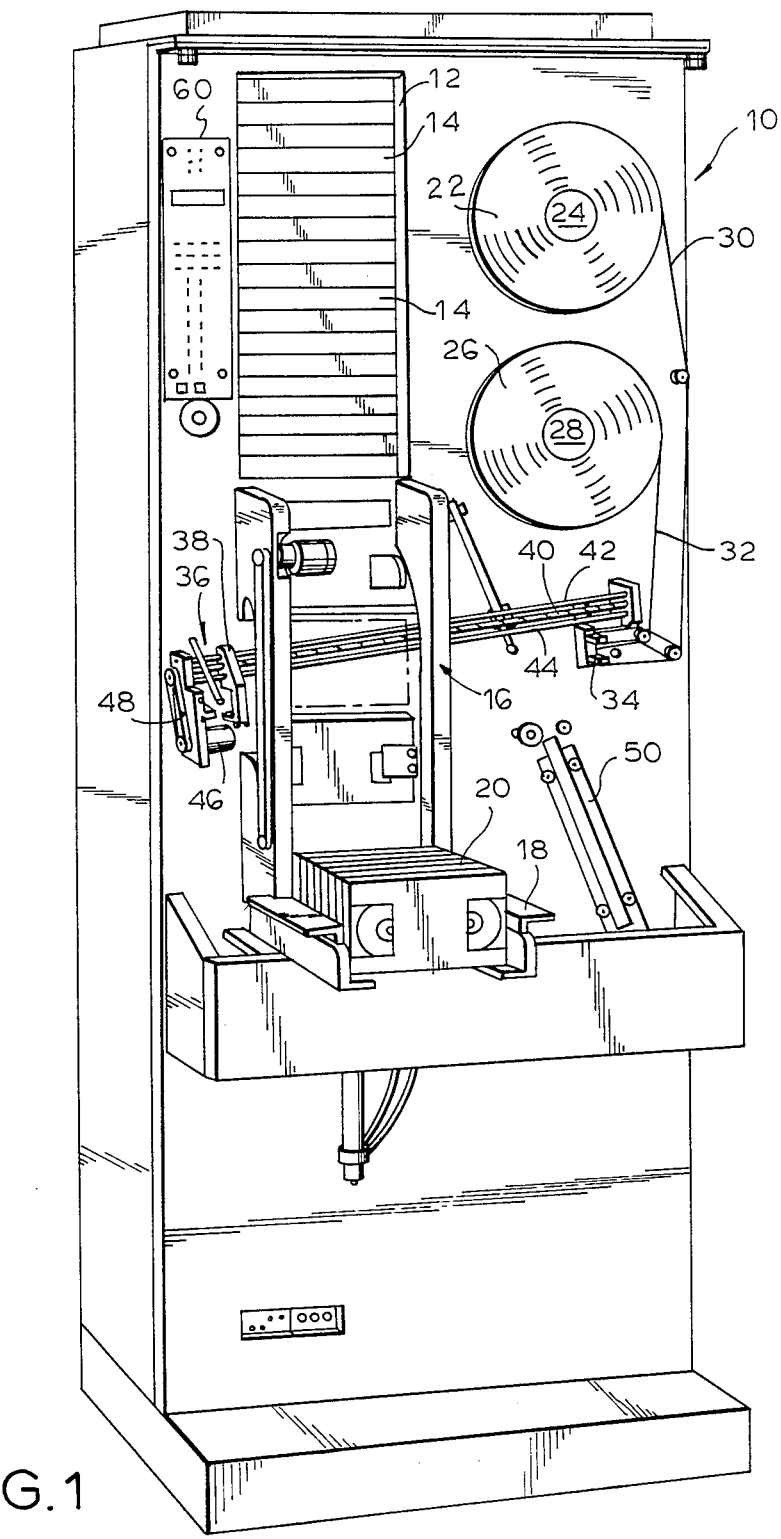
FIG. 1 is a perspective view of a cassette winding machine in accordance with the present invention.

Referring now to the drawings, and specifically to FIG. 1, a cassette winding machine according to the invention is shown and designated generally by the reference numeral 10. The machine 10 has a magazine 12, which may contain a number of empty cassettes 14. The magazine 12 may be automatically loaded with cassettes by a hopper system. The machine 10 also has a conventional tape winding unit 16 and an exit stacker 18, which may contain a number of complete cassettes 20. The complete cassettes may manually be removed from the exit stacker 18, or they may be supplied to a conveyor system (not shown) via an exit chute (not shown). The machine 10 winds video cassettes, which may be wound with videotape adapted for either a VHS format or a BETA format. Although a cassette winding machine that handles videotape is illustrated, the present invention is also applicable to cassette winding machines that handle audio tape, as well as to other equipment in which automatic tape threading is necessary or desirable.

FIG. 1 depicts a supply reel 22 mounted on an upper machine hub 24 and a supply reel 26 mounted on a lower machine hub 28. The hubs 24 and 28 are mounted for rotation on the machine 10 and driven by motors (not shown). A tape 30 from the upper supply reel 22 together with a tape 32 from the lower supply reel 26 are shown connected to a tape support, which is generally designated by the reference numeral 34.

FIG. 1 illustrates a threading assembly, which is generally designated by the reference numeral 36. The threading assembly 36 includes a threading head 38, which is mounted on and displaced by an endless thread screw 40. A gripper device is connected to the lower end of the threading head 38. The gripper device is shown in greater detail in FIGS. 4 through 7 and discussed in the following paragraphs. The threading assembly 36 also includes an upper guide rod 42 and a lower guide rod 44. The threading head 38 slides along and is guided by the guide rods 42 and 44 as it is moved by the endless thread screw 40. A motor 46 is energized to rotate the endless thread screw 40 through a belt 48.

Figure 2:
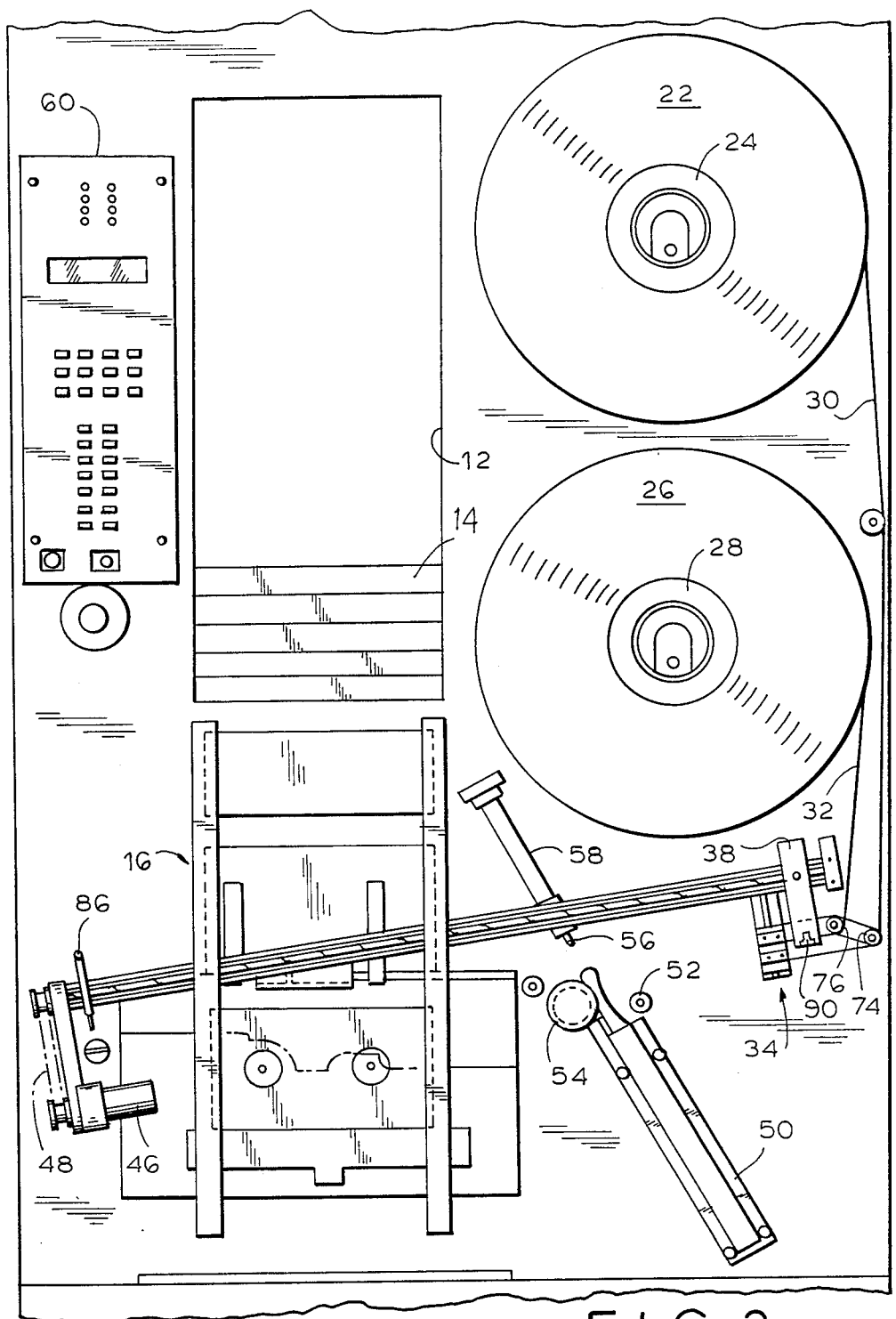
FIG. 2 is an enlarged, front elevational view of the cassette winding machine shown in FIG. 1 and illustrates various components of the machine in more detail.

FIG. 2 shows the tape support 34 and the threading assembly 36 in greater detail. FIG. 2 also shows a vacuum chamber 50 along with associated inlet and outlet guide rollers 52 and 54, respectively. The vacuum chamber 50 is a conventional device that is utilized to control the tension on the tape being used, e.g., either the tape 30 or the tape 32, during tape winding operations. In particular, the vacuum chamber 50 cooperates with a control unit (not shown) for the machine 10 in a known manner to control the motor (not shown) for the supply reel being used, e.g., either the supply reel 22 or the supply reel 26. A push rod 56 is extended by a pneumatic actuation cylinder 58 to urge the use tape into the vacuum chamber 50 once the threading assembly 36 has threaded the use tape across the mouth of the vacuum chamber 50. The operation of the threading assembly 36, including the gripper device, will be explained at length during the discussion of FIGS. 3 through 7.

A programing or control panel 60 is shown in the upper left portion of FIG. 2. The control panel 60 is connected to the control unit (not shown), which includes a microprocessor. An operator may use the control panel 60 to program various machine operating parameters, such as ramp, speed, and quantity for each individual batch of cassettes.

Figure 3:
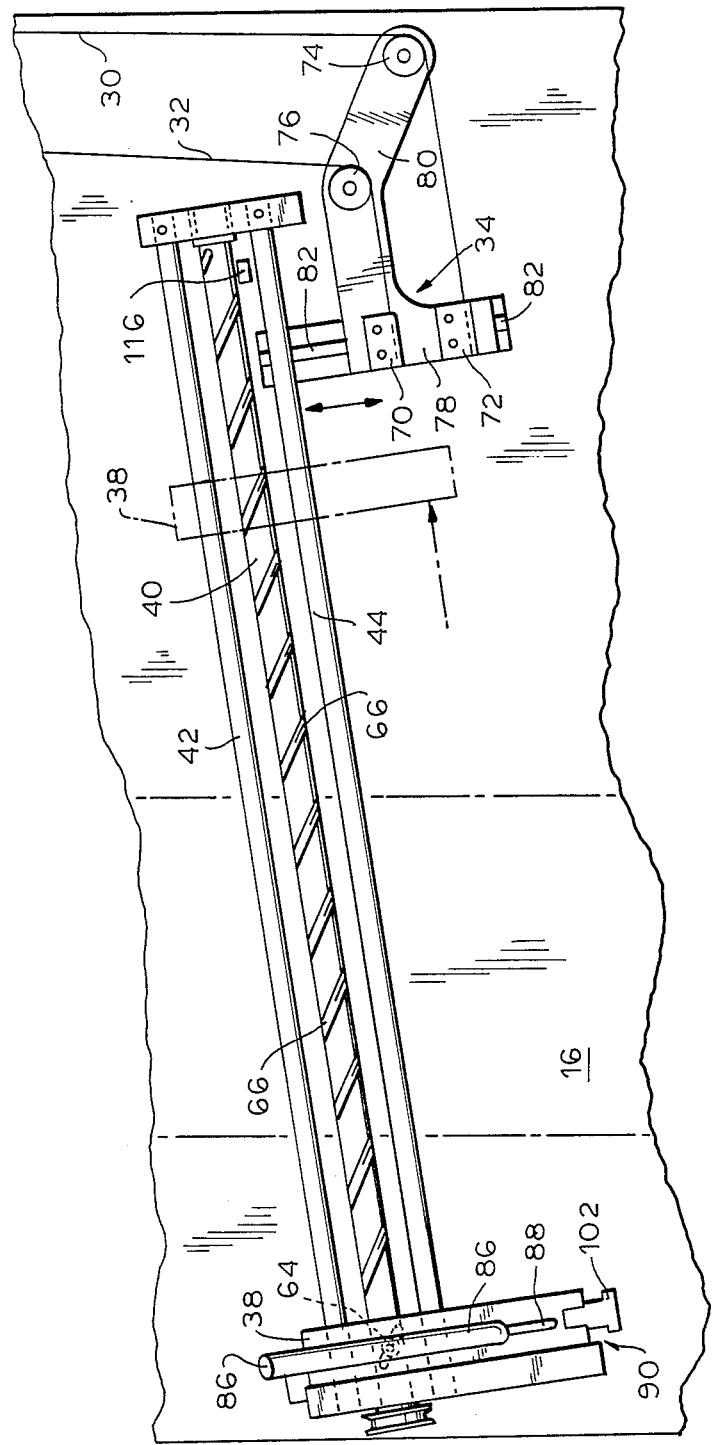
FIG. 3 is a fragmentary, enlarged, front elevational view of the tape threading assembly and the tape support of the machine shown in FIG. 1.

FIG. 3 depicts the threading assembly 36 and the tape support 34 on an enlarged scale. The location of the tape winding unit 16 is indicated by the vertical lines with long and short dashes in FIG. 3. The threading head 38 is illustrated with solid lines in a position on the left side of the tape winding unit 16 and with dashed lines in a position on the right side of the tape winding unit 16. As FIG. 3 shows, the threading assembly 36 includes a cam follower 64 that is attached to the threading head 38 and inserted into a thread 66 of the endless thread screw 40. This arrangement is illustrated on the left in FIG. 3. The cam follower 64 cooperates with the endless thread screw 40 to shift the threading head 38 to various positions along the guide rods 42 and 44 as the endless thread screw 40 rotates.

Referring to the right side of FIG. 3, the tape support 34 has an upper support block 70 and a lower support block 72. The tape 30 travels from the upper supply reel 22 (not shown in FIG. 3), around a lower guide roller 74, to the lower support block 72. Similarly, the tape 32 travels from the lower supply reel 26 (not shown in FIG. 3), around the upper guide roller 76, to the upper support block 70. Each of the support blocks 70 and 72 has a channel for receiving tape in its lower surface. One or more holes are drilled in each channel, and the holes are connected to a vacuum source. An operator manually directs the tape from one of the supply reels around the associated guide roller and then places it on the associated support block, where it is held by the vacuum.

Figure 5:
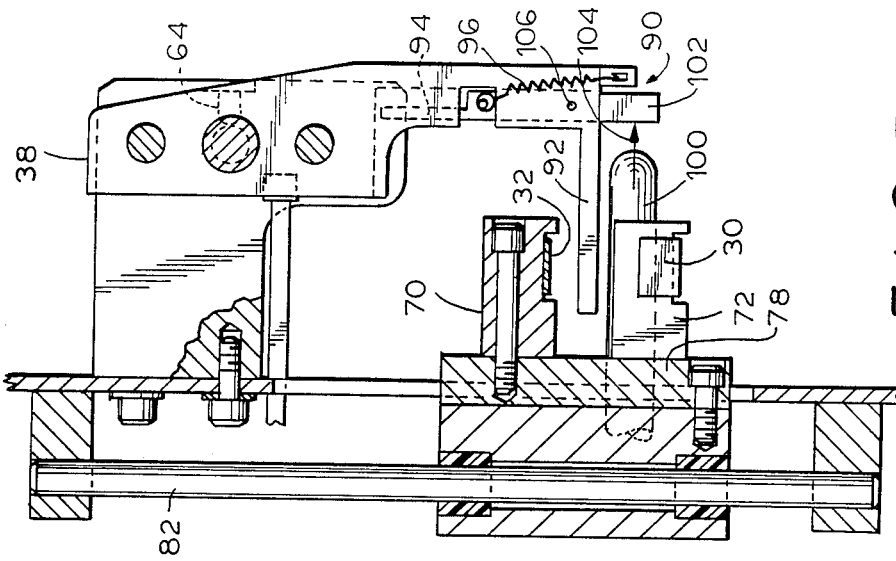
FIG. 5 is a fragmentary, sectional view taken along line 5—5 of FIG. 4 and shows the gripper device in an open position ready to take the tape from the upper support block.
Figure 4:
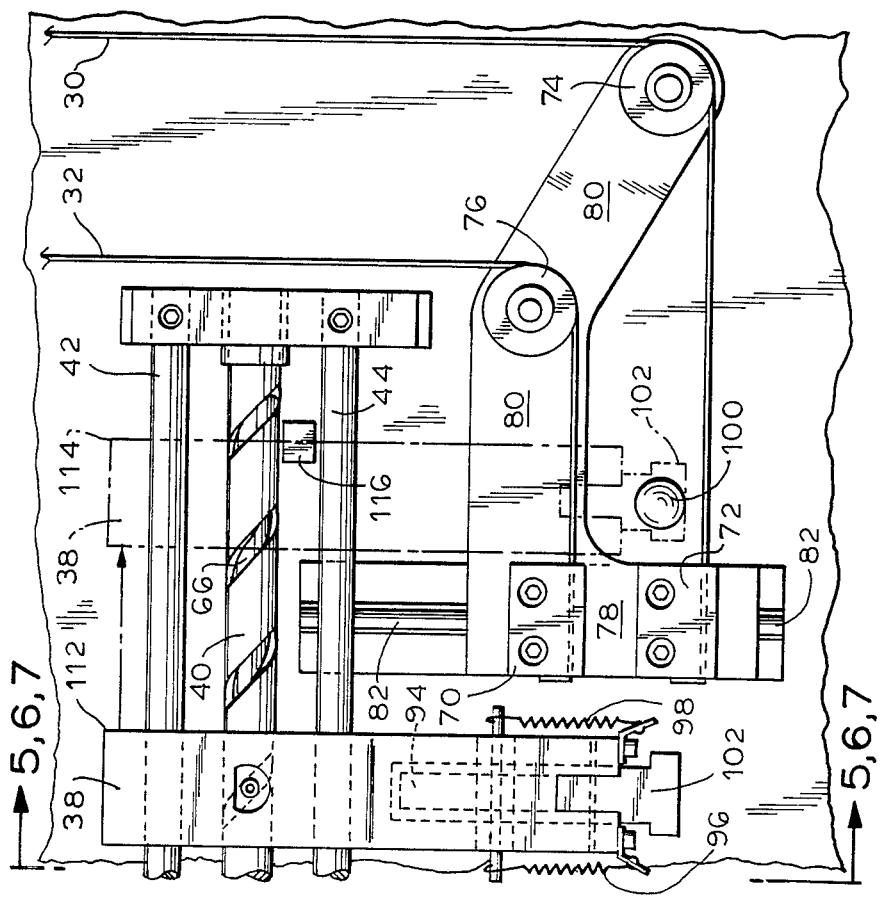
FIG. 4 is a fragmentary, enlarged, front elevational view of the machine shown in FIG. 1 and depicts the tape threading head and the gripper device in greater detail.

Additionally, each support block may have one or more vacuum holes drilled in its side surface that faces the tape winding unit 16. These vacuum holes permit the support block to hold the very end of the tape in an upright position, where it will not interfere with the movement of the threading head 38. For instance, FIG. 4 shows both support blocks 70 and 72 holding the free ends of the tapes 32 and 30, respectively, in upright positions. FIG. 5 also shows the free end of the tape 30 being held vertically by the support block 72.

The support blocks 70 and 72 are mounted on a support plate 78, which has an angled arm 80. The angled arm 80 extends from the support plate 78 toward the supply reels, i.e., to the right as shown in FIG. 3. The guide rollers 74 and 76 are rotatably mounted on the angled arm 80, and the support plate 78 is slidable mounted on a guide rod 82. Consequently, the support blocks 70 and 72 as well as the guide rollers 74 and 76 move as a unit when the support plate 78 is repositioned along the guide rod 82.

The threading assembly 36 includes a gripper device for selectively gripping and releasing a desired tape, as mentioned previously. Before the operation of the gripper device is explained in detail, the operation of the threading assembly 36 and the threading head 38 will be briefly discussed in connection with FIGS. 1 through 3. The operator first places the desired tape on one of the tape support blocks, where it is held by vacuum. The threading head 38 is moved from its initial position, which is illustrated on the left in FIG. 3, toward the tape support 34. FIG. 1 depicts the threading head 38 just after it leaves its initial position. The dashed lines on the right in FIG. 3 denote a subsequent position of the threading head 38 during movement along the guide rods 42 and 44. The right side of FIG. 2 shows the threading head 38 after it has stopped moving. Specifically, the threading head 38 is located between the support blocks 70, 72 and the guide rollers 74, 76.

From this position, the gripper device of the threading head 38 is operated to grab the tape. Now, with the tape secured in the gripper device, the threading head 38 is moved back to its initial position, which is illustrated by solid lines on the left in FIG. 3. When returning to its initial position, the threading head 38 pulls the desired tape across the tape winding unit 16 and positions the tape within reach of the winding unit 16.

FIGS. 1 through 3 show that the threading assembly 36 moves the threading head 38 in a straight line from side to side across the machine 10. This straight line movement is accomplished with a mechanically simple arrangement, which may be constructed without using costly components.

Once the tape is threaded past the tape winding unit 16, the tape may be introduced into the tape winding unit 16. The conventional splicing device in the tape winding unit 16 may then be utilized to sever the unwanted portion of the tape, i.e., the length of tape between the tape winding unit 16 and the threading head 38. The use of the conventional splicing device for this purpose eliminates the need for an auxiliary splicer and, therefore, avoids the problems associated with an auxiliary splicer.

The gripper device of the threading head 38 is shown in greater detail in FIGS. 4 through 7. As illustrated in these drawings, the gripper device is generally designated by the reference numeral 90. The gripper device 90 includes a stationary arm 92 and a movable arm 94. The movable arm 94 is shown in its vertical or up position in FIGS. 4 and 5 and shown in its horizontal or down position in FIGS. 6 and 7. The gripper device 90 further includes bistable springs 96 and 98, which hold the movable arm 94 in either its up position or its down position.

Figure 6:
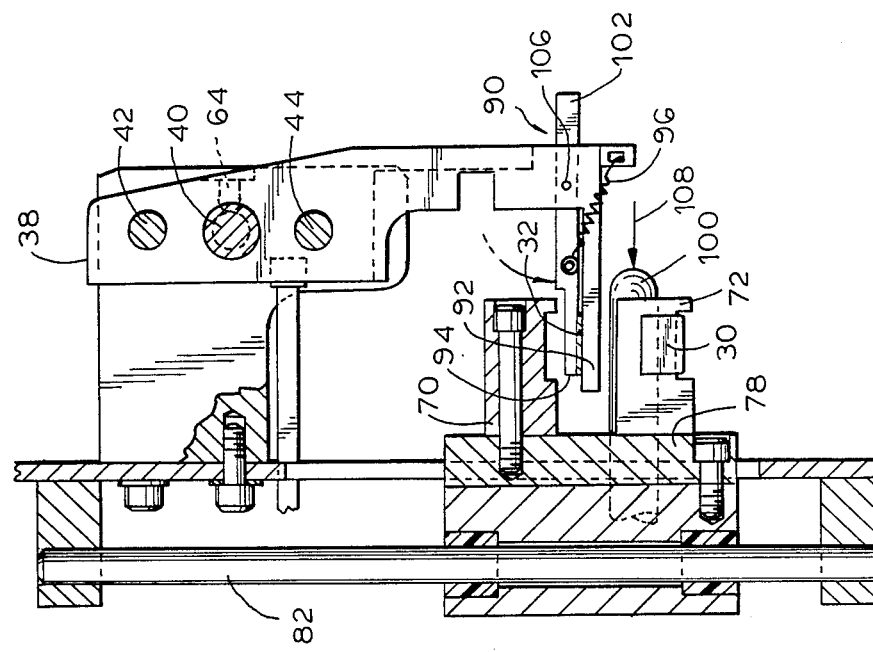
FIG. 6 is another fragmentary, sectional view taken along line 6—6 of FIG. 4 and shows the gripper device in a closed position after grabbing the tape from the upper support block.

The movable arm 94 is operated by a pusher 100, which is extended to cause the movable arm to change from its up position to its down position. In particular, the pusher 100 is extended from the front of the machine 10 and strikes a paddle 102 at the lower end of the movable ar 94. The arrow 104 in FIG. 5 shows the direction of movement of the pusher 100 as it is extended. When he pusher 100 moves to the right in FIG. 5 and strikes the paddle 102, the pusher 100 causes the movable arm 94 to rotate about a pivot point 106. The bistable springs 96 and 98 then force the movable arm 94 into its down position, as shown in FIG. 6. The pusher 100 is then retracted, as indicated by the arrow 108 in FIG. 6.

Figure 7:
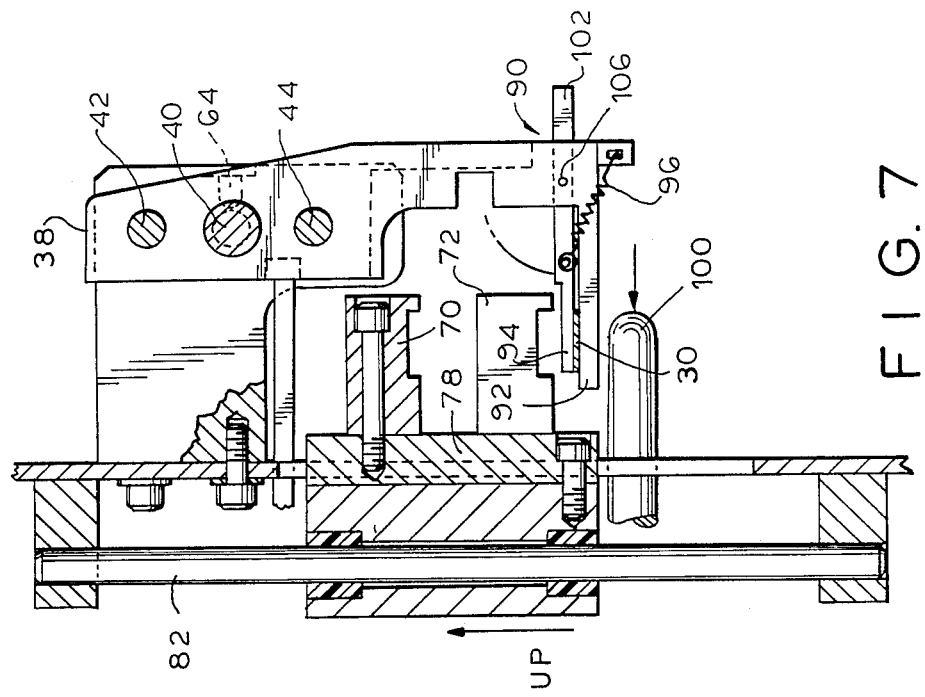
FIG. 7 is a further fragmentary, sectional view taken along line 7—7 of FIG. 4 and shows the gripper device in a closed position after grabbing the tape from the lower support block.

FIG. 6 illustrates the gripper device 90 after it has been operated to clasp the tape 32 from the lower supply reel 26 (not shown in FIG. 6) between its arms 92 and 94, while FIG. 7 illustrates the gripper device 90 after it has been operated to clasp the tape 30 from the upper supply reel 22 (not shown in FIG. 7) between its arms 92 and 94. As FIGS. 6 and 7 depict, the tape support 34 is suitably positioned so that the gripper device 90 may take the tape from either the upper support block 70 (FIG. 6) or the lower support block 72 (FIG. 7). These figures also illustrate that the gripper device 90 grasps the desired tape at a level that is slightly below the associated support block. The arms 92 and 94 take the tape at this level so that a clearance exists between the arms and the associated support block as the threading head 38 moves the gripper device 90 and the tape away from the tape support 34 toward the tape winding unit 16. The tape from either supply reel may be seized by the gripper device by appropriately positioning the tape support 34.

Preferably, the stationary arm 92 includes a pad, which may be made from a soft or flexible material, such as a plastic material. The pad helps prevent the tape from slipping between the arms 92 and 94. Additionally, the movable arm 94 may have grooves in the face that contacts the tape, or this face may have a surface like that of a file. A relatively rough face on the movable arm 94 cooperates with the pad on the stationary arm 92 to securely hold the tape between the arms.

FIGS. 4 through 6 illustrate how the threading head 38 is employed to take a selected tape from the associated support block. Initially, the threading head 38 is moved toward the right in FIG. 4 by the threading assembly 36. The threading head 38 is moved from the left side of the machine 10 (see FIGS. 1 and 2), through a solid-line position 112 in FIG. 4, and into a dashed-lined position 114 in FIG. 4. The dashed-line position 114 is the stopping point of the threading head 38. That is, the dashed-line position 114 is the tape gripping position of the threading head 38. While the threading head 38 moves toward the right, the movable arm 94 of the gripper device 90 is in its up position.

When the threading head 38 reaches the dashed-line position 114 in FIG. 4, the threading head 38 actuates a limit switch 116. The microprocessor in the control unit (not shown) senses the actuation of the limit switch 116 and stops the threading head 38. FIG. 4 shows that in the dashed-line position 114 of the threading head 38, the paddle 102 is aligned with the pusher 100. FIG. 5 shows, with solid lines, the threading head 38 in the tape gripping position.

Once the threading head 38 is stopped across from the pusher 100, the pusher 100 is extended, as denoted by the arrow 104 in FIG. 5. The pusher 100 strikes the paddle 102 and forces the movable arm 94 from its up position to its down position. The down position of the movable arm 94 is depicted in FIG. 6. With the selected tape clasped between the arms 92 and 94 of the gripper device 90, the threading head 38 is ready to be moved across the tape winding unit 16 to the other side of the machine 10, as discussed above. A person having ordinary skill in the art will recognize that the threading head 38 may be employed to take tape from the lower support block in the same manner that it is used to take tape from the upper support block.

A mechanism for opening the gripper device is shown on the left in FIG. 3. Namely, the gripper opening mechanism includes a pneumatic actuation cylinder 86 with a push rod 88. The actuation cylinder 86 and the push rod 88 are arranged so that they may open the gripper device 90 if the threading head 38 is in its initial position (which is also its final position), i.e., on the left in FIG. 3. When the threading head 38 is in this position with the gripper device 90 closed, e.g., after it has returned from the tape support 34 with a tape, the actuation cylinder 86 may be operated to open the gripper device 90. Specifically, the actuation cylinder 86 extends the push rod 88, which then strikes the paddle 102 and forces the movable arm 94 from its down position to its up position.

Figure 8:
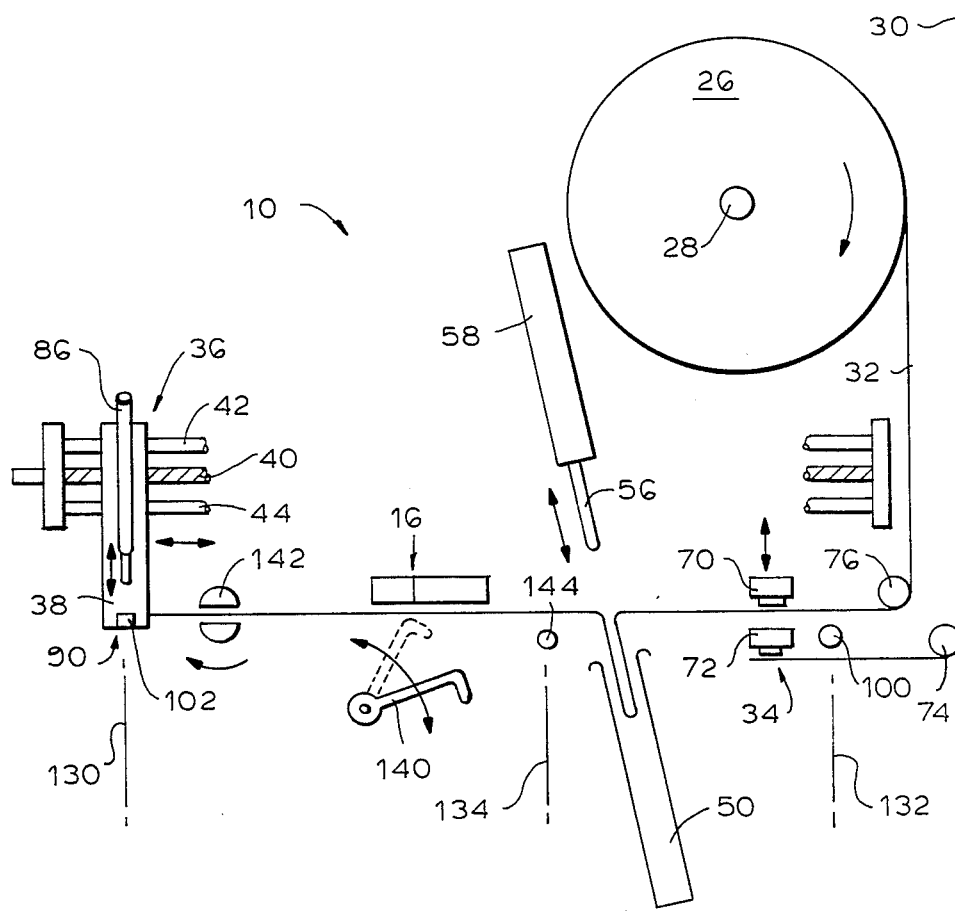
FIG. 8 is a schematic diagram of a cassette winding machine in accordance with the present invention.

Referring now to FIG. 8, the auto thread feature of the invention will be summarized. The operator initially places a supply reel with blank or prerecorded tape on one of the hubs 24, 28 and then manually places the free end of the tape on the associated support block of the tape support 34. At this time, the operator may also place another supply reel on the other hub and then manually place the free end of this tape on the associated support block of the tape support 34. The tape support 34 is suitably positioned so that the threading head 38 may take the desired tape.

The threading head 38 begins moving from a position on the control panel side of the machine 10, i.e., to the left of the tape winding unit 16 in FIG. 8. The original position of the threading head 38 is designated by a dashed line 130. The threading head 38 is moved by the endless thread screw 40 toward the supply reel side of the machine 10, i.e., to the right of the tape winding unit 16 in FIG. 8. The threading head 38 is stopped at a location between the support blocks 70, 72 and the guide rollers 74, 76. The stopped position of the threading head 38 is denoted by a dashed line 132. From this position, the gripper device 90 of the threading head 38 is operated by the pusher 100 to grab the desired tape.

The threading head 38 is then moved by the endless thread screw 40 back to its original position on the control panel side of the machine 10, i.e., as indicated by the dashed line 130. While it moves, the threading head 38 pulls the tape in a straight line from the associated guide roller 74 or 76 across the tape winding unit 16 without encountering another guide roller or similar component. The threading head 38 pulls the tape across the tape winding unit 16 by moving from the supply reel side of the tape winding unit 16 to the opposite side of the tape winding unit 16. With the tape threaded through the tape winding unit 16 in this manner, the tape winding unit 16 may utilize the tape in subsequent tape winding operations.

The microprocessor in the control unit may be suitably programmed to automatically control the movement of the tape support 34 and the threading head 38 as well as the actuation of the gripper device 90. The auto thread feature of the invention may be employed to thread single-reel cassette winding machines. Additionally, the auto thread feature of the invention may be employed to initially thread a dual-reel cassette winding machine and then to subsequently thread such a machine during the reel changing process. Accordingly, the operator is less likely to be injured during the tape threading procedure since the operator's contact with the machine is minimal.

Referring again to FIG. 8, after the threading head 38 returns to its original position 130, it is stopped. Then, a lifting arm 140 rotates upwardly (counterclockwise as shown in FIG. 8) to contact the tape, urge it upwardly, and seat it within the splicing device of the tape winding unit 16. Once the tape is seated in the splicing device, the lifting arm 140 is rotated downwardly (clockwise in FIG. 8). Where a conventional tape winding unit 16 includes an arm for lifting a leader from a cassette, this arm may advantageously be employed as the lifting arm 140 that seats the tape in the splicing device.

After the tape is seated in the splicing device of the tape winding unit 16, the push rod 56 is extended by the actuation cylinder 58 to urge the tape into the vacuum chamber 50. The push rod 56 is then retracted by the actuation cylinder 58, while a tape loop remains in the vacuum chamber 50. As explained previously, the vacuum chamber 50 is used to control the tension of the tape during tape winding operations.

Following the retraction of the push rod 56, a wind-off fork 142 is rotated to align the open space between its arms with the tape. The wind-off fork 142 is then extended from the face of the machine 10 so that the tape is positioned between its arms. Next, the wind-off fork 142 is rotated to take an unwanted section of tape off of the supply reel. For example, the wind-off fork 142 may be operated to wind the tape until the start of the first prerecorded program is located at the splicing device in the tape winding unit 16.

After the tape wind-off operation, the splicing device in the tape winding unit 16 cuts the tape into two sections. One section is connected to the supply reel, while the other section extends to the wind-off fork 142. The former section is utilized for tape winding operations along with the remainder of the tape on the supply reel 22, but the latter section is discarded. For instance, the wind-off fork 142, which is holding the unwanted tape section, may be retracted toward the machine 10 while a stationary member forces the unwanted tape section off of the arms of the wind-off fork 142. The unwanted tape section then falls under the influence of gravity into a collection bin and is later discarded.

Once the steps described above have been completed, the tape is suitably positioned within the tape winding unit 16 and available for tape winding operations. Additionally, the threading head 38 is in its original position 130 and ready to travel to its tape gripping position 132, from which another tape ma be threaded through the tape winding unit 16 in the manner described above.

FIG. 8 illustrates another aspect of the present invention. If the operator discovers that an insufficient amount of tape has been wound off of the supply reel after the tape has been cut by the splicing device and the unwanted section discarded, the threading head 38 may be controlled to again thread tape past the wind-off fork 142. Namely, the threading head 38 is moved from its original position 130 to an intermediate position between the tape winding unit 16 and the vacuum chamber 50. This intermediate position is denoted by a dashed line 134. When the threading head 38 reaches the intermediate position 134, it is stopped. An auxiliary pusher 144 is then extended from the face of the machine 10 to actuate the gripper device 90 of the threading head 38. The gripper device 90 grabs the tape and the threading head 38 is moved from its intermediate position 134 back to its original position 130. During this time, the tape remains threaded through the vacuum chamber 50. The lifting arm 140 and the wind-off fork 142 operate as described above, as does the splicing device in the tape winding unit 16.

Although a particular illustrative embodiment of the present invention has been described herein with reference to the accompanying drawings, the present invention is not limited to that particular embodiment. Various changes and modifications may be made thereto by those having ordinary skill in the art without departing from the spirit or scope of the invention, which is defied by the appended claims.

I claim:

1. A cassette winding apparatus for automatically alternating between a first supply reel having a first tape and a second supply reel having a second tape, said apparatus comprising:
   tape winding means for winding a predetermined length of a selected one of said first and second tapes into a cassette;
   support means for holding said first and second tapes, said support means being located on a given side of said tape winding means; and
   tape threading means for moving said selected tape from said given side of said tape winding means to an opposite side of said tap winding means, said tape threading means including grip means for selectively gripping and releasing said selected tape.

2. A cassette winding apparatus as recited in claim 1, wherein said grip means grips said selected tape at a location near said support means.

3. A cassette winding apparatus as recited in claim 1, wherein said tape threading means moves in a substantially straight line between said given side and said opposite side of said tape winding means.

4. A cassette winding apparatus as recited in claim 3, wherein said tape threading means includes an endless thread screw, a guide rod, and a movable head, said movable head being threaded onto said endless thread screw, whereby said movable head is displaced when said endless thread screw is rotated, said movable head being guided during movement by said guide rod, said grip means being mounted on said movable head.

5. A cassette winding apparatus as recited in claim 1, further comprising means for seating said selected tape in said tape winding means.

6. A cassette winding apparatus as recited in claim 5, wherein said tape winding means includes a lifting arm capable of lifting a leader from said cassette, wherein said seating means includes said lifting arm, and wherein said seating means actuates said lifting arm to seat said selected tape in said tape winding means.

7. A cassette winding apparatus as recited in claim 1, further comprising vacuum chamber means for controlling tension on said selected tape, said vacuum chamber means being located on said given side of tape winding means, said cassette winding apparatus additionally comprising means for inserting said selected tape into said vacuum chamber means.

8. A cassette winding apparatus as recited in claim 7, wherein said inserting means includes a rod and means for actuating said rod to urge said selected tape into said vacuum chamber means, said actuating means being actuated after said tape threading means has moved said selected tape from said given side to said opposite side of said tape winding means, thereby placing said selected tape across said vacuum chamber means.

9. A cassette winding apparatus as recited in claim 1, further comprising means for shifting said support means between a first position and a second position, said grip means being capable of gripping said first tape when said support means is in said first position, said grip means being capable of gripping said second tape when said support means is in said second position.

10. A cassette winding apparatus as recited in claim 9, wherein said support means has a first support block and a second support block, each of said first and second support blocks being connected to a vacuum, whereby said first support block holds said first tape when said first tape is placed proximate said first support block an said second support block holds said second tape when said second tape is placed proximate said second support block.

11. An automatic tape threading apparatus for threading tape from one of a plurality of tape supply reels into a tape processing unit, said apparatus comprising:

holding means for holding a plurality of tape ends from said plurality of tape supply reels, said holding means being located on a given side of said tape processing unit;

tape transport means for moving a desired tape end, and thereby moving the associated tape, said tape transport means including grip means for selectively gripping and releasing tape, said tape transport means additionally including means for shifting said grip means between a first position proximate said holding means and a second position on an opposite side of said tape processing unit, said grip means being capable of gripping said desired tape end when said grip means is shifted to said first position; and means for introducing said desired tape into said tape processing unit after said grip means with said desired tape end is shifted to said second position.

12. An automatic tape threading apparatus as recited in claim 11, wherein said grip shifting means moves said grip means in a substantially straight line between said first position and said second position.

13. An automatic tape threading apparatus as recited in claim 11, further comprising means for positioning said tape holding means among a plurality of positions, each position being associated with a tape supply reel and a tape end, said grip means being capable of gripping said desired tape end when said holding means is positioned in the associated position.

14. A cassette winding apparatus for automatically alternating between a first supply reel having a first tape and a second supply reel having a second tape, said apparatus comprising:

tape winding means for winding a predetermined length of a selected one of said first and second tapes into a cassette;

support means for holding said first and second tapes, said support means being located on a given side of said tape winding means;

grip means for selectively gripping and releasing tape;

positioning means for moving said grip means between a first position and a second position, said first position being proximate said support means on said given side of said tape winding means, said second position being on an opposite side of said tape winding means, said grip means being capable of gripping said selected tape when said grip means is in said first position, said positioning means moving said selected tape across said tape winding means as said positioning means moves said grip means between said first and second positions.

15. A method for operating a cassette winding apparatus with a first supply reel having a first tape, a second supply reel having a second tape, and tape winding means for winding a predetermined length of a selected one of said first and second tapes into a cassette, the method comprising the steps of:

placing said selected tape on a support located on a given side of said tape winding means;

positioning near said support a threading head including grip means for selectively gripping and releasing said selected tape;

gripping said selected tape with said grip means; and moving said threading head from said given side of said tape winding means to an opposite side of said tape winding means, thereby placing said selected tape across said tape winding means.

16. A method as recited in claim 15, further comprising the step of releasing said selected tape after said threading head reaches said opposite side of said tape winding means.

17. A method as recited in claim 15, wherein said moving step includes moving said threading head in a substantially straight line from said given side to said opposite side of said tape winding means.

18. A method as recited in claim 15, further comprising the step of cutting said selected tape at a point within said tape winding means to sever an unwanted portion of said selected tape from the remaining portion of said selected tape.

19. A method as recited in claim 18, further comprising the following steps after said cutting step:

moving said threading head from said opposite side of said tape winding means to an intermediate location between said cut point and said support;

gripping said selected tape with said grip means; and moving said threading head from said intermediate location to said opposite side of said tape winding means, thereby placing said selected tape across said tape winding means.

20. A method as recited in claim 15, further comprising the step of seating said selected tape in said tape winding means.

21. A method as recited in claim 15, further comprising the step of automatically inserting said selected tape into a device for controlling tape tension.

22. A method as recited in claim 15, wherein said support includes a first holder and a second holder, and wherein said placing step includes placing said first tape on said first holder and placing said second tape on said second holder.

23. A method as recited in claim 22, further comprising the step of shifting said support between a first position in which said grip means may grip said first tape and a second position in which said grip means may grip said second tape.

24. A method of operating tape equipment having a tape processing unit and a plurality of tape supply reels, the method comprising the step of:

holding a plurality of tape ends from said plurality of tape supply reels on a given side of said tape processing unit;

aligning grip means for selectively gripping and releasing tape with a desired tape end;

gripping said desired tape end with said grip means;

moving said grip means from said given side of said tape processing unit to an opposite side of said tape processing unit, thereby moving said desired tape end past said tape processing unit and placing the associated tape across said tape processing unit; and introducing said associated tape into said tape processing unit.

25. A method as recited in claim 24, wherein the holding step includes holding the plurality of tape ends with a plurality of holding members, and wherein the aligning step includes moving the holding member associated with said desired tape end into a position in which the grip means may grip said desired tape end.

* * * * *